US008370556B2

United States Patent
Sakugawa

(10) Patent No.: US 8,370,556 B2
(45) Date of Patent: *Feb. 5, 2013

(54) MULTI-CORE DATA PROCESSOR

(75) Inventor: Mamoru Sakugawa, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/342,804

(22) Filed: Jan. 3, 2012

(65) Prior Publication Data

US 2012/0173780 A1    Jul. 5, 2012

Related U.S. Application Data

(63) Continuation of application No. 12/985,227, filed on Jan. 5, 2011, now Pat. No. 8,108,586, which is a continuation of application No. 12/366,718, filed on Feb. 6, 2009, now Pat. No. 7,890,685.

(30) Foreign Application Priority Data

Feb. 14, 2008   (JP) ................................ 2008-033030

(51) Int. Cl.
  *G06F 13/00*   (2006.01)
(52) U.S. Cl. ........ 710/317; 710/240; 710/305; 711/141; 718/106
(58) Field of Classification Search .......... 710/316–317, 710/240–244, 200; 718/106; 711/141
See application file for complete search history.

(56) References Cited

U.S. PATENT DOCUMENTS

| 5,241,627 | A | * | 8/1993 | Silver et al. .................. 709/226 |
| 6,078,976 | A | * | 6/2000 | Obayashi ...................... 710/315 |
| 6,701,407 | B1 |  | 3/2004 | Honjo et al. |

FOREIGN PATENT DOCUMENTS

| JP | 01-138144 U | 9/1989 |
| JP | 02-289020 A | 11/1990 |
| JP | 05-081059 A | 4/1993 |
| JP | 11-096084 A | 4/1999 |
| JP | 2001-167067 A | 6/2001 |

OTHER PUBLICATIONS

Japanese Office Action dated Feb. 21, 2012 received in Japanese App. No. 2008-033030 (and English translation).

* cited by examiner

*Primary Examiner* — Brian Misiura
*Assistant Examiner* — Kim Huynh
(74) *Attorney, Agent, or Firm* — Miles & Stockbridge P.C.

(57) ABSTRACT

A multi-core LSI with improved stability of operation. The multi-core LSI includes a plurality of CPUs coupled to a first shared bus, one or more modules coupled to a second shared bus, a shared bus controller coupled between the first shared bus and the second shared bus for arbitrating access to the module(s) by the CPUs, and a system controller that monitors whether or not a response signal to an access request signal of the CPUs is output from a module to be accessed, wherein the system controller outputs a pseudo response signal to the first shared bus via the shared bus controller to terminate access by the CPU while accessing if the response signal is not output from the module to be accessed after the access request signal is output to the second shared bus from the shared bus controller and before a predetermined time elapses.

3 Claims, 9 Drawing Sheets

FIG. 4

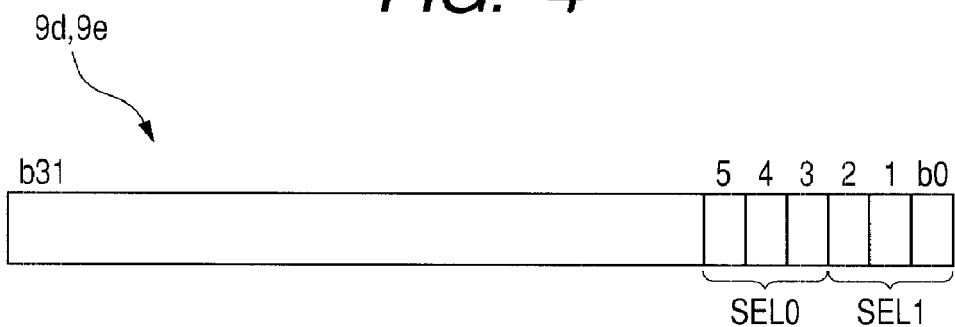

| B | BIT NAME | FUNCTION | R | W |
|---|---|---|---|---|
| 31-6 | 0 FIXED | | 0 | 0 |
| 5-3 | SEL0 | 000: TIMEOUT INTERRUPT IS NOT GENERATED<br>001: NMI IS GENERATED FOR TIMEOUT DUE TO ITS OWN CPU<br>010: INT IS GENERATED FOR TIMEOUT DUE TO ITS OWN CPU<br>100: DBI IS GENERATED FOR TIMEOUT DUE TO ITS OWN CPU | R | W |
| 2-0 | SEL1 | 000: TIMEOUT INTERRUPT IS NOT GENERATED<br>001: NMI IS GENERATED FOR TIMEOUT DUE TO ANOTHER CPU<br>010: INT IS GENERATED FOR TIMEOUT DUE TO ANOTHER CPU<br>100: DBI IS GENERATED FOR TIMEOUT DUE TO ANOTHER CPU | R | W |

FIG. 5

| | INTERRUPT CONTROL REGISTER 9d (CPU#0) | | INTERRUPT CONTROL REGISTER 9e (CPU#0) | |
|---|---|---|---|---|
| | b5~b3 (SEL0) | b2~b0 (SEL1) | b5~b3 (SEL0) | b2~b0 (SEL1) |
| MODE 1 (NMI IS GENERATED UPON UNAUTHORIZED ACCESS OF ITS OWN CPU) | 001 | 000 | 001 | 000 |
| MODE 2 (MASKABLE INTERRUPT IS GENERATED UPON UNAUTHORIZED ACCESS OF ITS OWN CPU) | 010 | 000 | 010 | 000 |
| MODE 3 (DEBUG INTERRUPT IS GENERATED UPON UNAUTHORIZED ACCESS OF ITS OWN CPU) | 100 | 000 | 100 | 000 |
| MODE 4 (NMI IS ALWAYS GENERATED UPON UNAUTHORIZED ACCESS) | 001 | 001 | 001 | 001 |
| MODE 5 (MASKABLE INTERRUPT IS ALWAYS GENERATED UPON UNAUTHORIZED ACCESS) | 010 | 010 | 010 | 010 |
| MODE 6 (DEBUG INTERRUPT IS GENERATED UPON UNAUTHORIZED ACCESS) | 100 | 100 | 100 | 100 |
| MODE 7 (NMI IS GENERATED UPON UNAUTHORIZED ACCESS OF ITS OWN CPU AND MASKABLE INTERRUPT IS GENERATED UPON UNAUTHORIZED ACCESS OF ANOTHER CPU) | 001 | 010 | 001 | 010 |
| MODE 7 (DEBUG INTERRUPT IS GENERATED UPON UNAUTHORIZED ACCESS OF ITS OWN CPU AND MASKABLE INTERRUPT IS GENERATED UPON UNAUTHORIZED ACCESS OF ANOTHER CPU) | 100 | 010 | 100 | 010 |

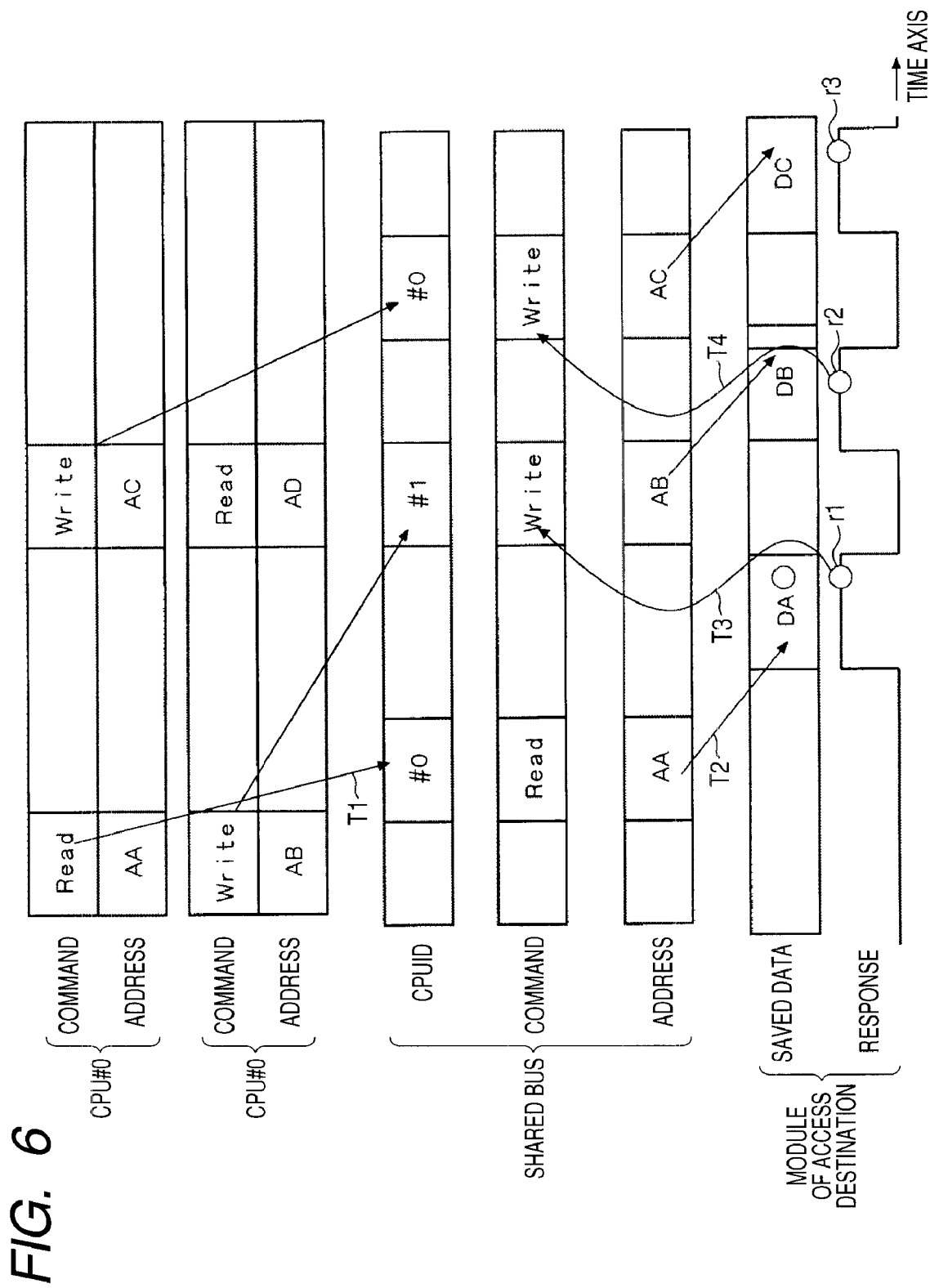

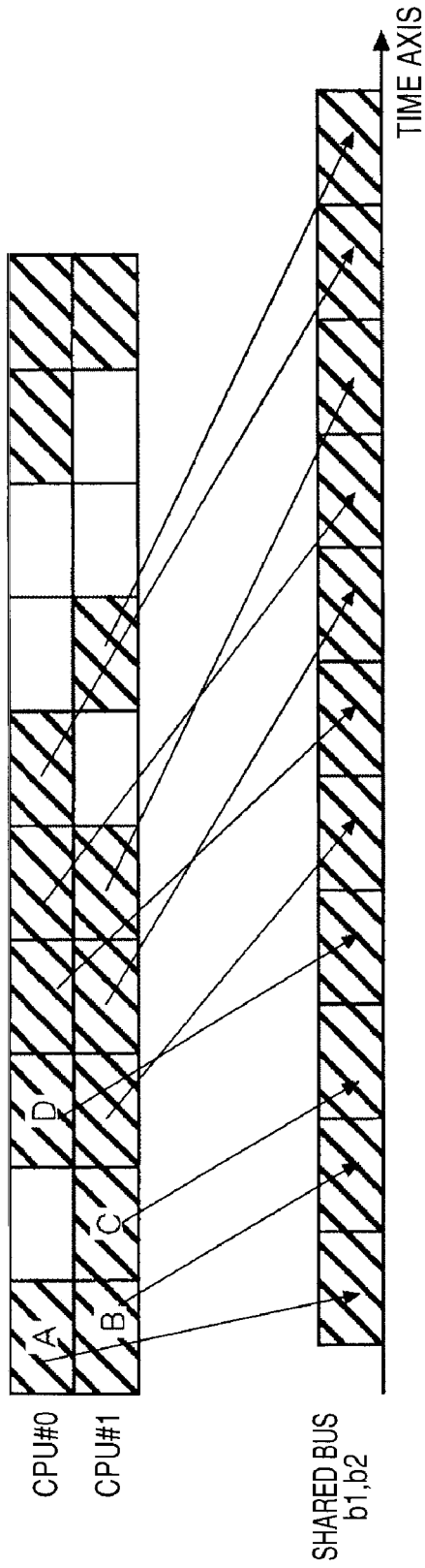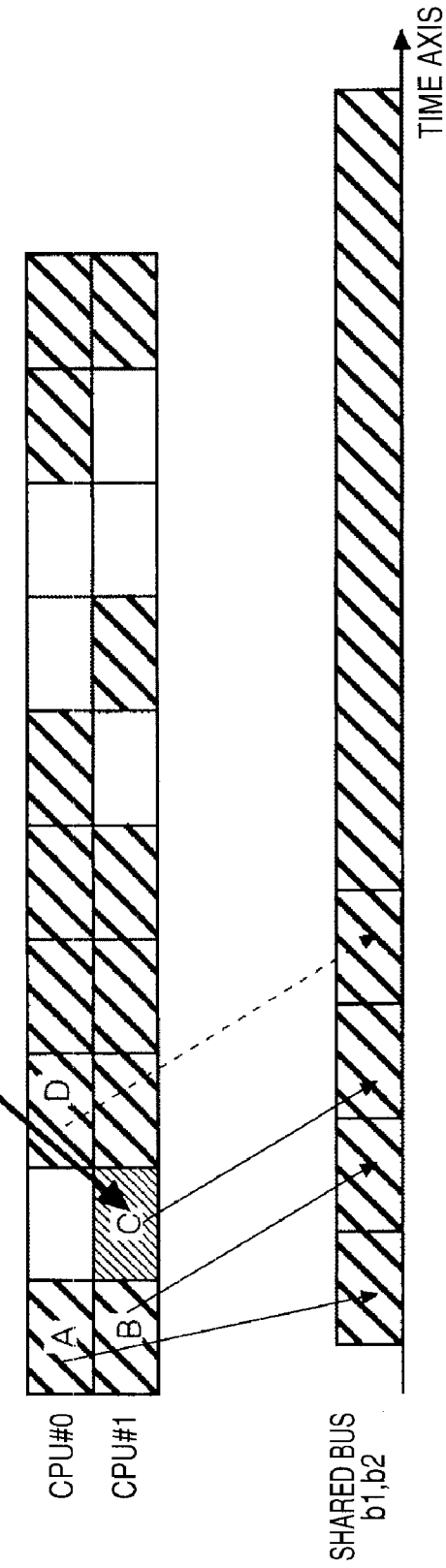

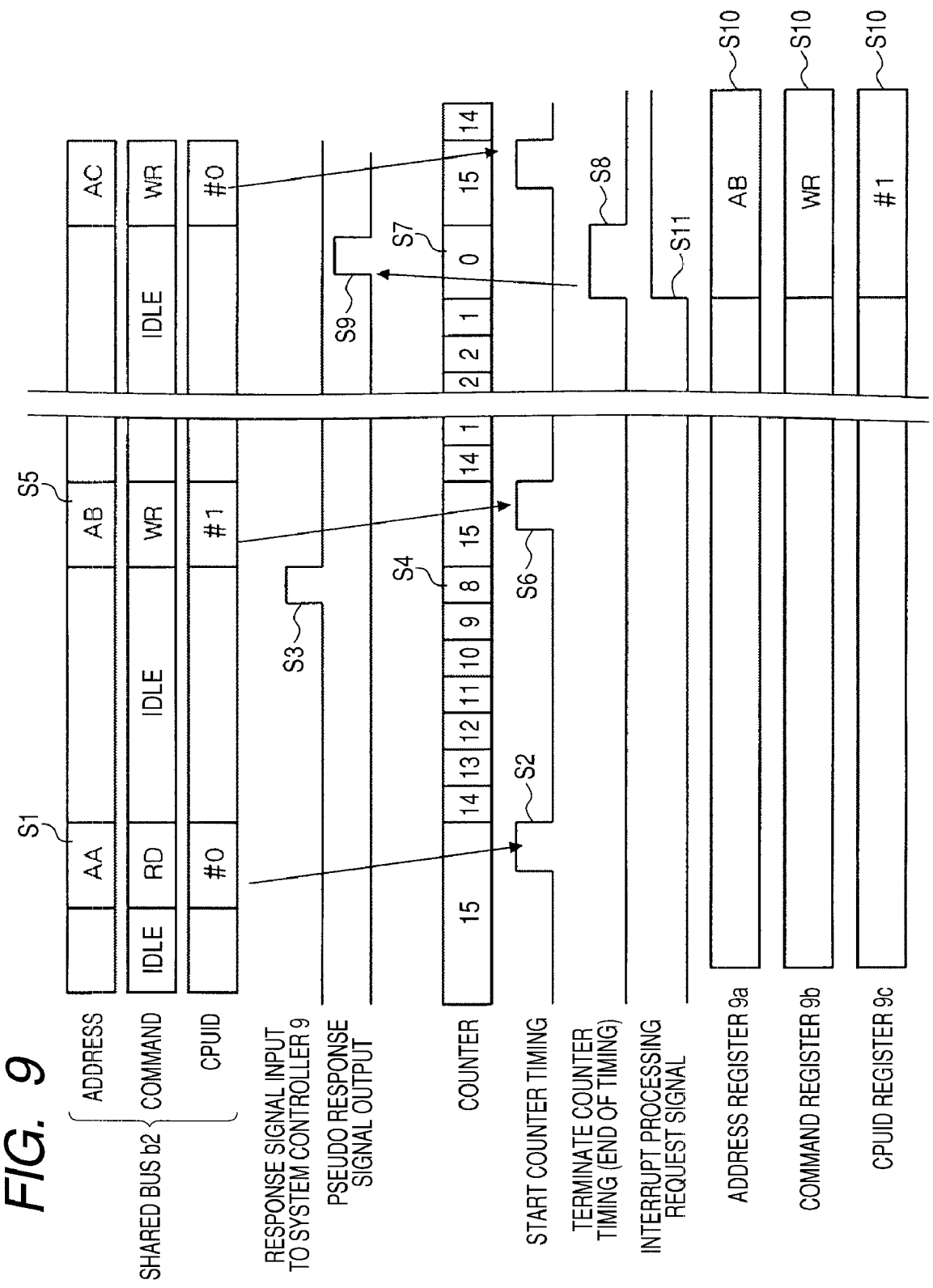

MULTI-CORE DATA PROCESSOR

CROSS-REFERENCE TO RELATED APPLICATIONS

This application is a continuation of application Ser. No. 12/985,227 filed Jan. 5, 2011 now U.S. Pat. No. 8,108,586, which is a continuation of application Ser. No. 12/366,718 filed Feb. 6, 2009, (now U.S. Pat. No. 7,890,685). The present application also claims priority from Japanese patent application No. JP 2008-33030 filed Feb. 14, 2008, the content of which is hereby incorporated by reference into this application.

BACKGROUND OF THE INVENTION

The present invention relates to a multi-core LSI (multi-core data processor) on which a plurality of CPUs is mounted over the same LSI.

In a multi-core LSI over which the CPUs are mounted on the same LSI, when the CPUs are debugging software that runs independently of each another, if a shared bus has hung up because a program runs out of control (access to an unintended region etc.), it is not possible to identify which access by which CPU has caused the hang up and debugging of software becomes difficult to perform.

The case where a certain CPU runs out of control to cause a shared bus to hang up while other CPUs are running normally corresponds to the above case. In this case, due to the hang up of the shared bus, not only the CPU to be debugged but also other normal CPUs can no longer access and come to a stop. Consequently, it has been impossible to effectively debug software in a multi-core LSI even using a debug technique for a single-core LSI (LSI mounting one CPU).

As a technique for debugging in a single-core LSI, the following (1) and (2) are known.

(1) A system controller monitors a shared bus and if the access does not terminate after a predetermined time elapses (that is, a CPU runs out of control), the system controller detects it, outputs a pseudo response signal to the shared bus, and terminate the access by the CPU while accessing, and at the same time, causing the CPU to execute an interrupt processing. After that, the operation of the CPU is analyzed and which CPU has run out of control at which point in the program is identified by checking at which point in the program the interrupt processing has been processed (prior art 1).

(2) A WDT (Watch Dog Timer) is known as a function to detect a timeout for a fixed processing period of time among processing of software. In this case, at which point the CPU has run out of control is identified by detecting a timeout using a WDT and causing the CPU to execute an interrupt processing (prior art 2).

As a prior art document about the detection of timeout, patent document 1 (Japanese patent laid-open No. 2001-167067) is known.

SUMMARY OF THE INVENTION

When the above-mentioned prior art 1 is extended to a multi-core LSI, the current situations are such that there is no effective technique how to output an interrupt request signal to each CPU and how to identify which access by which CPU has caused a hang up.

When the above-mentioned prior art 2 is used for a multi-core LSI, if the shared bus itself has hung up and an attempt is made to detect the hang up using the WDT and cause the other normal CPUs to execute an interrupt processing, it is not possible for the normal CPU to execute the interrupt processing unless the CPU to be debugged releases the bus right.

As described above, conventionally, even if a hang up occurs in a shared bus in a multi-core LSI, it is not possible to identify which access by which CPU has caused the hang up, and there has been a problem that the efficiency of program development is poor.

If a certain CPU has run out of control and caused a shared bus to hang up, the other normal CPUs can no longer access and come to a stop, and therefore, there has also been a problem that the stability of operation of an LSI is poor.

The present invention has been developed in order to solve the above problems and a first object thereof is to provide a multi-core LSI capable of improving the stability of operation and a second object thereof is to provide a multi-core LSI capable of improving the efficiency of program development.

In order to solve the above problems, a multi-core LSI according to a first aspect of the present invention comprises: a plurality of CPUs coupled to a first shared bus; one or more modules coupled to a second shared bus; a shared bus controller coupled between the first shared bus and the second shared bus, for arbitrating an access to the module(s) by the CPUs; and a system controller that monitors whether or not a response signal to an access request signal of the CPU is output from the module to be accessed, wherein the system controller outputs a pseudo response signal to the first shared bus via the shared bus controller to terminate the access by the CPU while accessing if the response signal is not output from the module to be accessed after the access request signal is output to the second shared bus from the shared bus controller and before a predetermined time elapses.

According to the first aspect of the present invention, the system controller outputs a pseudo response signal to the first shared bus via the shared bus controller to terminate the access by the CPU while accessing if the response signal is not output from the module to be accessed after the access request signal is output to the second shared bus from the shared bus controller and before a predetermined time elapses. Consequently, even when the response signal is not output from the module to be accessed because of the occurrence of a bug etc., it is possible to prevent the multi-core LSI from stopping when the CPU while accessing occupies the shared bus for a long period of time, and thus, the stability of operation of the multi-core LSI can be improved.

BRIEF DESCRIPTION OF THE DRAWINGS

FIG. 4 is a diagram for explaining the specifications of interrupt control registers 9d and 9e in FIG. 2.

FIG. 5 is a diagram for explaining an example of setting data to be set to the interrupt control registers 9d and 9e in FIG. 2.

FIG. 6 is a diagram for explaining the outline of the operation when a conventional multi-core LSI is normal.

FIG. 8 is another diagram for explaining the outline of the operation when the conventional multi-core LSI is normal and when a timeout occurs.

FIG. 9 is a diagram for explaining the operation of the multi-core LSI according to the first embodiment.

DETAILED DESCRIPTION OF THE PREFERRED EMBODIMENTS

First Embodiment

General Configuration

Figure 1:
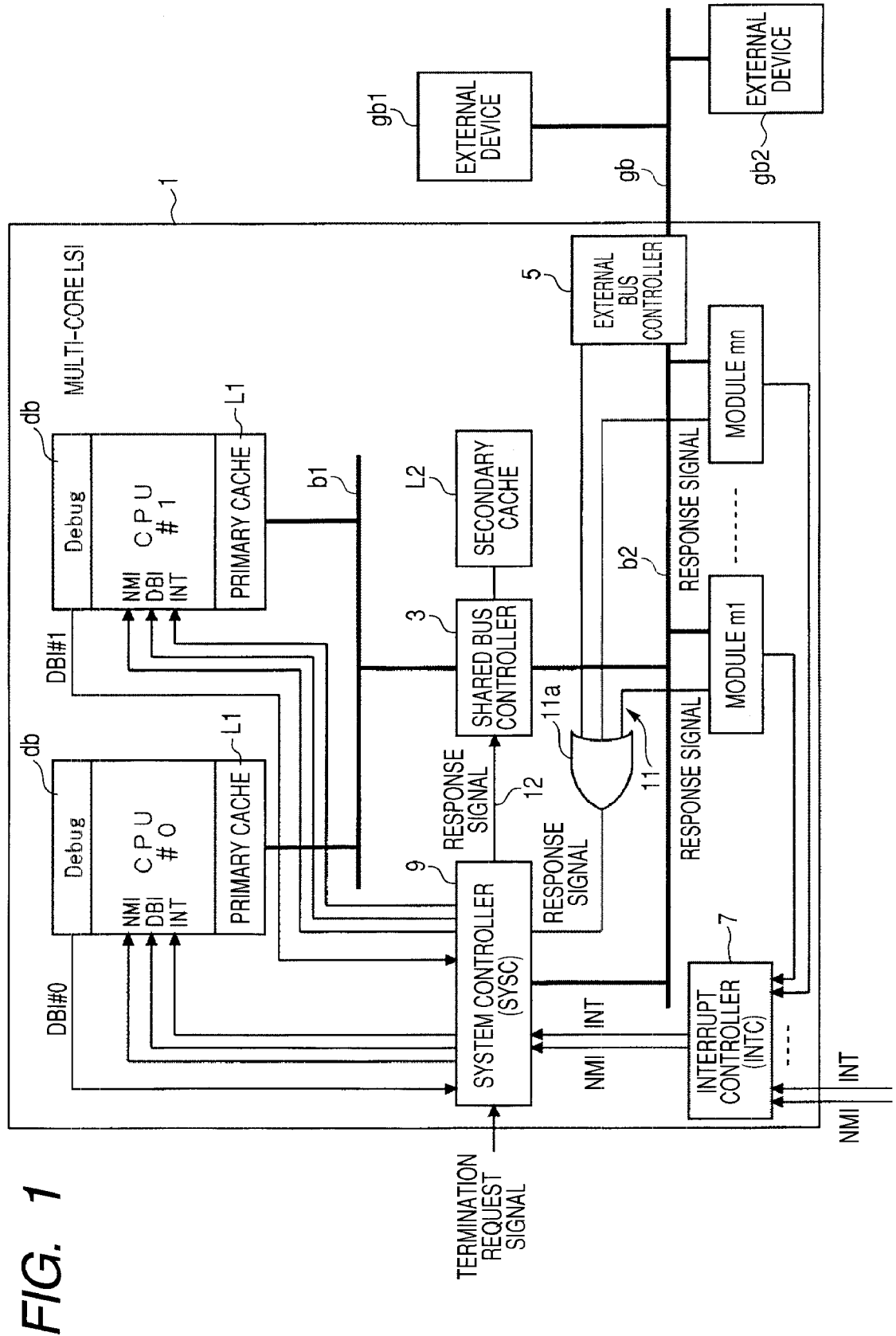
FIG. 1 is a configuration diagram of a multi-core LSI according to a first embodiment.

A multi-core LSI 1 according to a first embodiment comprises, as shown in FIG. 1, a plurality of CPUs (for example, two), that is, a CPU #0 and a CPU #1, a shared bus controller 3 that arbitrates the access by each of the CPUs #0 and #1, a shared bus b1 to which the respective components #0, #1, and 3 are coupled, one or more (for example, n) modules m1 to mn, such as a ROM and RAM, an external bus controller 5 that is an interface with an external bus gb, an interrupt controller 7 that causes each of the CPUs #0 and #1 to execute an interrupt processing, a shared bus b2 to which the respective components m1 to mn, 3, and 5 are coupled, and a system controller 9 that monitors the shared bus b2.

Each of the shared buses b1 and b2 is made up of an address bus through which the address of an access destination is transmitted, a command bus through which a command (for example, read, write, response signal, etc.) is transmitted, a data bus through which data is transmitted, and a CPUID bus through which the ID of the CPU #0 or #1 of an access source is transmitted.

Each of the CPUs #0 and #1 is a general one and comprises a debug function db, a primary cache L1, and various interrupt request signals, such as an NMI (non-maskable interrupt), an INT (maskable interrupt), and a DBI (debug interrupt), from the system controller 9.

The debug function db is a general one that communicates with an external device to implement functions necessary to debug programs, such as execution control of programs of the CPUs #0 and #1, breakpoint control, display of a register within the CPU, and a function to output an execution history of the CPUs #0 and #1 to outside in response to a request signal from outside.

The input signal NMI represents a non-maskable interrupt request signal. The input signal DBI represents a debug interrupt request signal. The input signal INT represents a maskable interrupt request signal. Each of the CPUs #0 and #1 executes various interrupt processing in response to a request signal input to each of input parts NMI, DBI, and INT, respectively.

When accessing each of external devices gd1 and dg2 coupled to each of the modules m1 to mn or the external bus gb, each of the CPUs #0 and #1 outputs the address of an access destination, a read or write command, and the ID of the CPU #0 or #1 of an access source (CPUID) to the address bus, the command bus, and the CPUID bus of the shared bus b1, respectively, as an access request signal, and further outputs the data to be written to the data bus of the shared bus b1 when the command is a write command.

Each of the CPUs #0 and #1 starts accessing by outputting an access request signal to the shared bus b1 and terminates the access when acquiring a response signal to the access request signal through the shared bus b1.

The shared bus controller 3 may comprise a secondary cache L2. The case where the secondary cache L2 is provided will be described hereinafter.

When receiving an access request signal from the CPU #0 or #1 through the shared bus b1, the shared bus controller 3 accesses the secondary cache L2 and checks if the data to be read is saved in the secondary cache L2. Then, when saved, the shared bus controller 3 outputs the saved data to the CPU #0 or #1 of the access source through the shared bus b1 and at the same time, outputs a response signal to the access request signal through the shared bus b1 when the command of the access request signal is "read", and when the command of the access request signal is "write", the shared bus controller 3 writes data to the L2 cache and at the same time, outputs a response signal to the access request signal through the shared bus b1.

When the target data is not saved in the secondary cache, the shared bus controller 3 outputs the access request signal received through the shared bus b1 to the shared bus b2.

When receiving a response signal and data to be read from each of the modules m1 to mn or the external bus controller 5 from the shared bus b2, the shared bus controller 3 outputs the response signal and the data to be read to the shared bus b1.

When a pseudo response signal, to be described later, is input from the system controller 9 via a dedicated wiring line 12, the shared bus controller 3 outputs the pseudo response signal to the shared bus b1 and causes the CPU #0 or #1 while accessing to receive the signal to terminate the access forcibly. The pseudo response signal is a response signal that the system controller 9 outputs instead when the access destination of the access request signal does not output the response signal.

When receiving an access request signal to its own module through the shared bus b2, each of the modules m1 to mn outputs a response signal to the access request signal to the shared bus b2 and at the same time, outputs a response signal also to the system controller 9 through a dedicated wiring line 11.

The dedicated wiring line 11 comprises, for example, an OR circuit 11a and has a configuration in which each response signal output part of each of the modules m1 to mn and the external bus controller 5 is connected by a wiring line to a plurality of input parts of the OR circuit 11a and a response signal input part of the system controller 9 is connected by a wiring line to the output part of the OR circuit 11a. When a response signal is input to any of the input parts, the OR circuit 11a outputs a response signal from its output part.

The external bus controller 5 relays the communication between the external devices gd1 and gd2 coupled to the external bus gb and each of the CPUs #0 and #1.

When various interrupt request signals are input from each of the modules m1 to mn or the external device (not shown), the interrupt controller 7 outputs each of the input signals NMI, DBI, and INT of each of the CPUs #0 and #1 through the system controller 9 and causes each of the CPUs #0 and #1 to execute the various interrupt processing.

The system controller 9 monitors an access request signal in the shared bus b2. Then, the system controller 9 monitors whether or not a response signal to an access request signal is output to the shared bus b2 from the access destination of the access request signal after the access request signal is output from the shared bus controller 3 to the shared bus b2 and before a predetermined time elapses.

Then, when the response signal is not output to the shared bus b2 before the predetermined time elapses, the system controller 9 determines that the shared bus b1 and b2 have hung up due to the occurrence of a bug etc. when the predetermined time elapses (that is, when a timeout occurs), and performs the following processing (1), (2), and (3).

That is, processing (1) outputs a pseudo response signal to the shared bus controller 3, for example, via the dedicated wiring line 12, causes the shared bus controller 3 to output the pseudo response signal to the shared bus b1 and the CPU #0 or #1 of the access source to acquire the signal, and then terminates the access forcibly.

Processing (2) saves at least one of the CPUID, the read or write command, and the address that the CPU #0 or #1 while accessing has output upon the access.

Processing (3) causes the CPUs #0 and #1 to execute various interrupt processing by outputting a signal to the input signals NMI, DBI, and INT of the CPUs #0 and #1. Consequently, it is made possible to infer the position at which a bug has occurred.

When a termination request signal is input from an external device, the system controller 9 outputs a pseudo response signal to the shared bus controller 3 to terminate the access by the CPUs #0 and #1 forcibly even before the predetermined time elapses.

<Configuration of System Controller 9>

Figure 2:
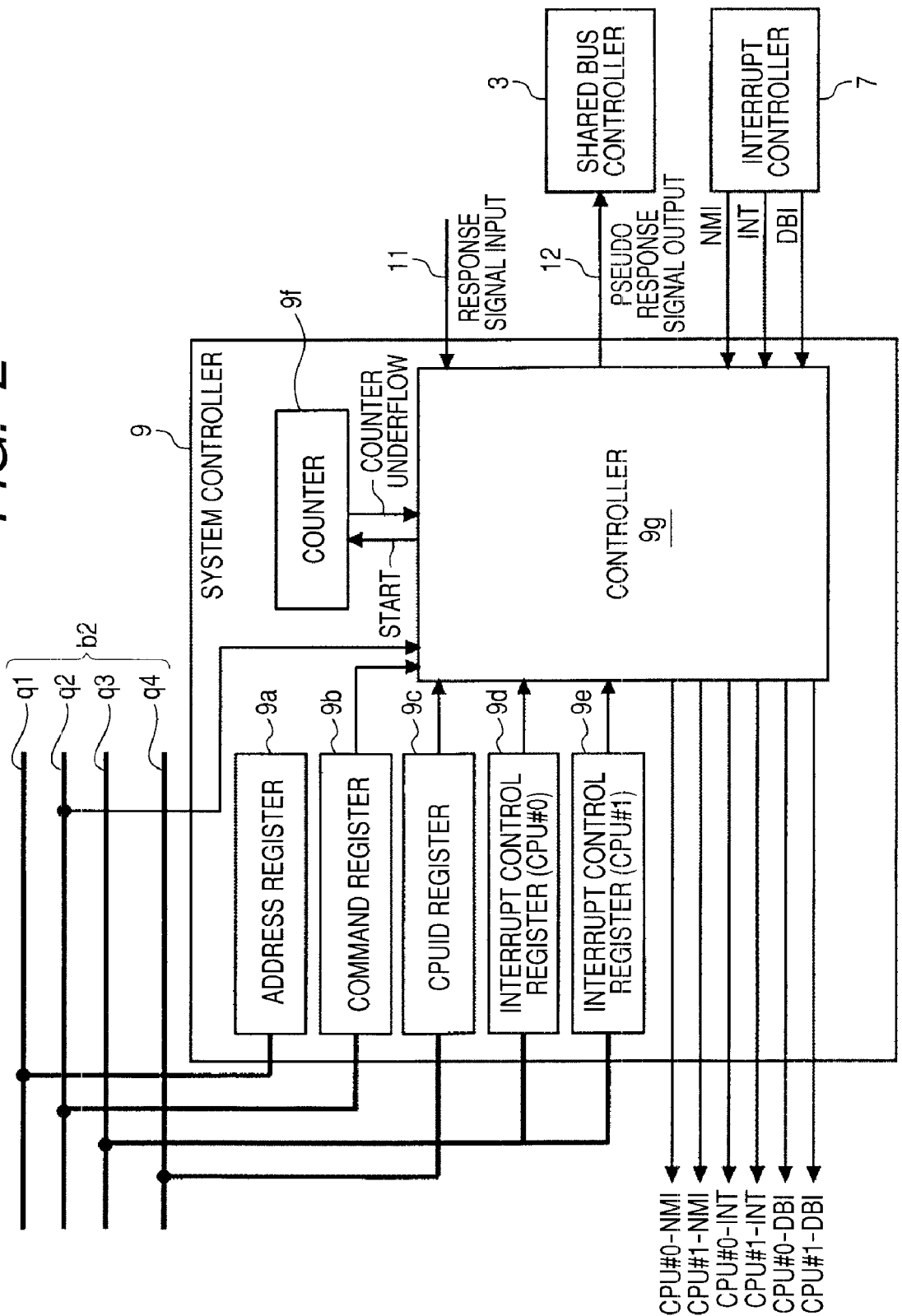
FIG. 2 is a schematic configuration diagram of a system controller 9 in FIG. 1.

As shown in FIG. 2, the system controller 9 comprises an address register 9a, a command register 9b, a CPUID register 9c, interrupt control registers 9d and 9e provided for each of the CPUs #0 and #1, a counter 9f, and a controller 9g.

The address register 9a is coupled to an address bus q1 of the shared bus b2, the command register 9b is coupled to a command bus q2 of the shared bus b2, the CPUID register 9c is coupled to a CPUID bus q3 of the shared bus b2, and the interrupt control registers 9d and 9e are coupled to a data bus q4 of the shared bus b2.

Each of the registers 9a, 9b, and 9c stores the address, command, and CPUID of the access request signal output from the shared bus controller 3 to the shared bus b2 in accordance with the control by the controller 9f.

The controller 9g monitors whether or not a command (read or write command) of an access request signal is output to the command bus q2 of the shared bus b2. Then, when detecting that a command of an access request signal is output to the command bus q2 of the shared bus b2, the controller 9g determines that an access request signal is output from the shared bus controller 3 to the shared bus b2 and causes the counter 9f to start timing of a predetermined time.

Then, the controller 9g monitors whether or not a response signal is input to the controller 9g itself from the access destination of the access request signal (that is, whether or not a response signal to the access request signal is output from the access destination to the shared bus b2) through the dedicated wiring line 11 before the counter 9f finishes the timing of the predetermined time.

Then, when a response signal is input to the controller 9g itself through the dedicated wiring line 11 before the counter 9f finishes the timing of the predetermined time, the controller 9g determines that a response signal to the access request signal is output from the access destination to the shared bus b2 (without the occurrence of a bug), and causes the counter 9 to suspend the timing of the predetermined time.

On the other hand, when the counter 9f has finished the timing of the predetermined time before a response signal is input to the controller 9g itself through the dedicated wiring line 11 (that is, when a timeout has occurred), the controller 9g determines that a bug etc. has occurred and the shared buses b1 and b2 have hung up, and performs the following processing (1), (2), and (3).

That is, in the processing (1), the controller 9g outputs a pseudo response signal to the shared bus controller 3 through, for example, the dedicated wiring line 12 and causes the shared bus controller 3 to output the pseudo response signal to the shared bus b1 and causes the CPUs #0 and #1 while accessing to acquire it, and then terminates the access forcibly.

In the processing (2), the controller 9g acquires the address, the read or write command, and the CPUID of the access request signal from the shared bus b2 and stores them in each of the registers 9a, 9b, and 9c, respectively. The address, the command, and the CPUID stored as above are used to identify which access by which of the CPUs #0 and #1 has occurred a bug.

In the processing (3), the controller 9g Outputs the interrupt request signals NMI, DBI, and INT to each of the CPUs #0 and #1 to cause each of the CPUs #0 and #1 to execute various interrupt processing in accordance with the CPUID stored in the CPUID register 9c and the setting data stored in advance in the interrupt control registers 9d and 9e.

By changing the setting data stored in the interrupt control registers 9d and 9e, it is possible to change the kind of interrupt processing that each of the CPUs #0 and #1 is caused to execute when a bug occurs. The setting data stored in the interrupt control registers 9d and 9e can be changed by, for example, outputting an interrupt request signal to the input parts NMI, DBI, and INT of the CPU #0 or #1 from outside via the interrupt controller 7 and the system controller 9 and causing the CPU #0 or #1 to execute the interrupt processing.

<Configuration of Controller 9b>

Figure 3:
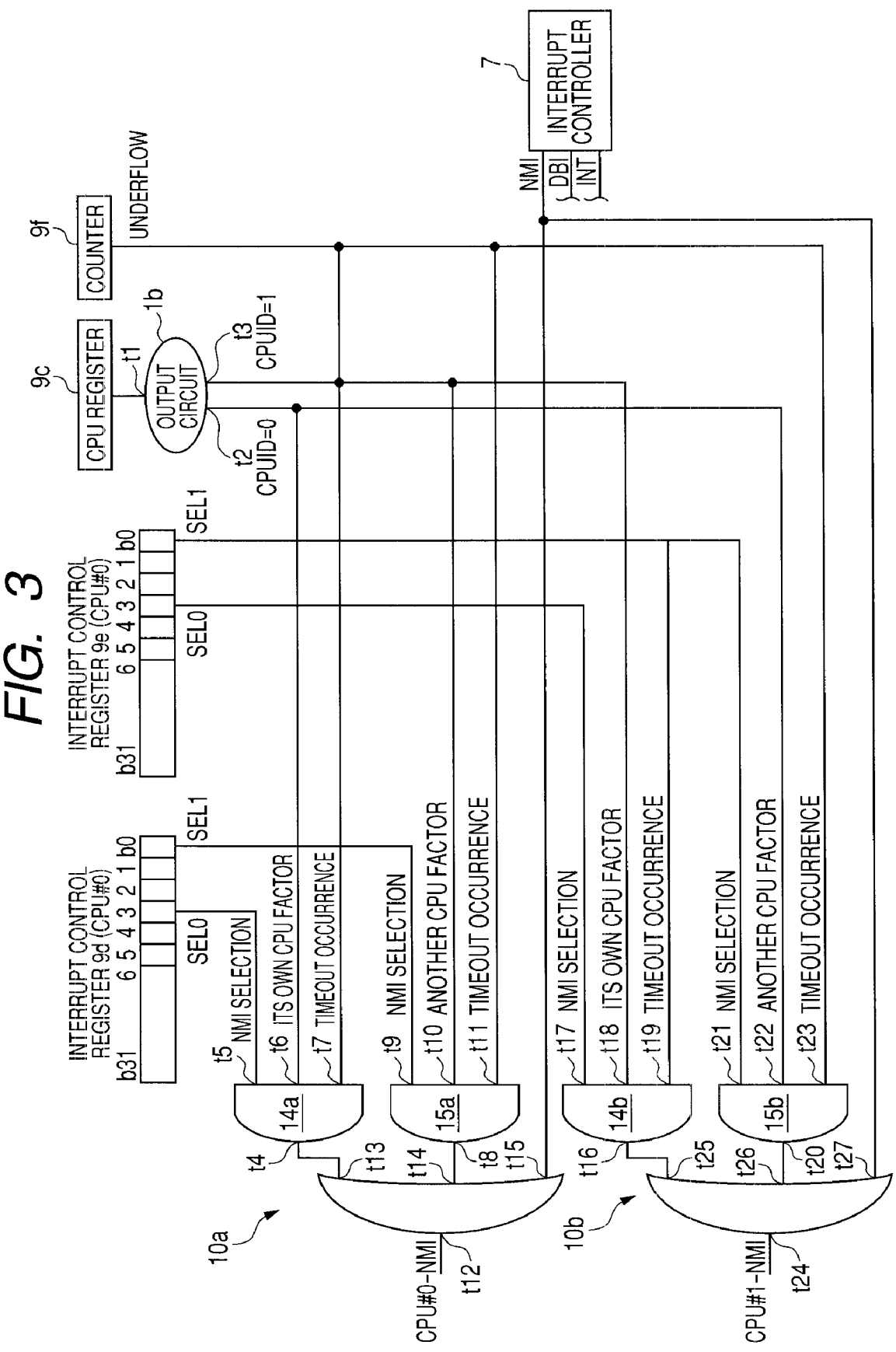
FIG. 3 is a schematic configuration diagram of a logic circuit at a part that outputs a non-maskable interrupt request signal of a controller 9g in FIG. 2.

FIG. 3 is a diagram showing a logic circuit 10a at the part that controls the output of the interrupt request signal NMI of the CPUs #0 and #1 in the controller 9g.

The logic circuit 10a comprises an OR circuit 13a, AND circuits 14a and 15a, and an output circuit 16.

The output circuit 16 has one input part t1 and two output parts t2 and t3 and to the input part t1, the CPUID (#0 or #1) within the CPUID register 9c is input, and when the CPUID is #0, "0" and "1" are output respectively from each of the output parts t2 and t3 and, on the other hand, when the CPUID is #1, "1" and "0" are output respectively from each of the output parts t2 and t3.

The AND circuit 14a has one output part t4 and three input parts t5 to t7 and to the input part t5, the bit value ("0" or "1") of a predetermined bit position (for example, b5) within the interrupt control register 9b is input and to the input part t6, the output from the output part t2 of the output circuit 16 is input, and to the input part t7, the output of the counter 9f is input. The output of the counter 9f outputs "0" until the counter 9f finishes the timing of the predetermined time and outputs "1" when the counter 9f finishes timing of the predetermined time (that is, when a time-out occurs).

The AND circuit 15a has one output part t8 and three input parts t9 to t11 and to the input part t9, the bit value ("0" or "1") of a predetermined bit position (for example, b0) within the interrupt control register 9b is input and to the input part t10, the output from the output part t3 of the output circuit 16 is input, and to the input part t11, the output of the counter 9f is input.

The OR circuit 13a has one output part t12 and three input parts t13 to t15 and the output of the output part t12 is output to the input part NMI of the CPU#0 and to each of the input parts t13 and t14, the outputs from the outputs t4 and t8 of the AND circuits 14a and 15a are input, respectively, and to the input part t15, the non-maskable (NMI) interrupt request signal from the interrupt controller 7 is input (when there is an input of the NMI interrupt request signal, "1" is input and when there is no input of the NMI interrupt request signal, "0" is input).

Similarly, a logic circuit 10b at the part that controls the output of the interrupt request signal NMI of the CPU #1 comprises an OR circuit 13b, AND circuits 14b and 15b, and the output circuit 16.

The AND circuit 14b has one output part t16 and three input parts t17 to t19 and to the input part t17, the bit value ("0" or "1") of a predetermined bit position (for example, b3) within the interrupt control register 9e is input and to the input part t18, the output of the output part t3 of the output circuit 16 is input, and to the output part t19, the output of the counter 9f is input.

The AND circuit 15b has one output part t20 and three input parts t21 to t23 and to the input part t21, the bit value ("0" or "1") of a predetermined bit position (for example, b0) within the interrupt control register 9e is input and to the output part t22, the output of the output part t2 of the output circuit 16 is input, and to the output part t23, the output of the counter 9f is input.

The OR circuit 13b has one output part t24 and three input parts t25 to t27 and the output of the output part t24 is output to the interrupt request signal NMI of the CPU#1 and to each of the input parts t25 and t26, the outputs of the output parts t16 and t20 of the AND circuits 14b and 15b are input, respectively, and to the input part t27, the output of the non-maskable (NMI) interrupt request signal from the interrupt controller 7 is input.

Although not shown schematically, the logic circuit at the part that controls the output of the interrupt request signal to the input part INT of the CPU #0 is configured by making the following changes (1a) to (4a) to configure other parts into the same configuration in the logic circuit 10a.

(1a) The output of the output part t12 of the OR circuit 13a is input to the interrupt request signal INT of the CPU #0.

(2a) To the input part t5 of the AND circuit 14a, the bit value of the bit position b4 of the interrupt control register 9d is input.

(3a) To the input part t9 of the AND circuit 15a, the bit value of the bit position b1 of the interrupt control register 9d is input.

(4a) To the input part t15 of the OR circuit 13a, the maskable (INT) interrupt request signal from the interrupt controller 7 is input (when there is an input of the INT interrupt request signal, "1" is input and when there is no input of the INT interrupt request signal, "0" is input).

Although not shown schematically, the logic circuit at the part that controls the output of the interrupt request signal to the interrupt request signal INT of the CPU #1 is configured by making the following changes (1b) to (4b) to configure other parts into the same configuration in the logic circuit 10b.

(1b) The output of the output part t24 of the OR circuit 13b is input to the interrupt request signal INT of the CPU #1.

(2b) To the input part t17 of the AND circuit 14b, the bit value of the bit position b4 of the interrupt control register 9e is input.

(3b) To the input part t21 of the AND circuit 15b, the bit value of the bit position b1 of the interrupt control register 9e is input.

(4b) To the input part t27 of the OR circuit 13b, the maskable (INT) interrupt request signal from the interrupt controller 7 is input.

Although not shown schematically, the logic circuit at the part that controls the output to the interrupt request signal DBI of the CPU #0 is configured by making the following changes (1c) to (4c) to configure other parts into the same configuration in the logic circuit 10a.

(1c) The output of the output part t12 of the OR circuit 13a is input to the interrupt request signal DBI of the CPU #0.

(2c) To the input part t5 of the AND circuit 14a, the bit value of the bit position b5 of the interrupt control register 9d is input.

(3c) To the input part t9 of the AND circuit 15a, the bit value of the bit position b2 of the interrupt control register 9d is input.

(4c) To the input part t15 of the OR circuit 13a, the debug (DBI) interrupt request signal from the interrupt controller 7 is input (when there is an input of the DBI interrupt request signal, "1" is input and when there is no input of the DBI interrupt request signal, "0" is input).

Although not shown schematically, the logic circuit at the part that controls the output to the interrupt request signal DBI of the CPU #1 is configured by making the following changes (1d) to (4d) to configure other parts into the same configuration in the logic circuit 10b.

(1d) The output of the output part t24 of the OR circuit 13b is input to the interrupt request signal DBI of the CPU #1.

(2d) To the input part t17 of the AND circuit 14b, the bit value of the bit position b5 of the interrupt control register 9e is input.

(3d) To the input part t21 of the AND circuit 15b, the bit value of the bit position b2 of the interrupt control register 9e is input.

(4d) To the input part t27 of the OR circuit 13b, the debug (DBI) interrupt request signal from the interrupt controller 7 is input.

Each of the AND circuits 14a, 15a, 14b, and 15b outputs "1" from its output part only when "1" is input to all of the input parts. Each of the OR circuits 13a and 13b outputs "1" from its output part only when "1" is input to one or more of the input parts. Each of the CPUs #0 and #1 executes the non-maskable interrupt processing when "1" is input to the interrupt request signal NMI, executes the maskable interrupt processing when "1" is input to the interrupt request signal INT, and executes the debug interrupt processing when "1" is input to the interrupt request signal DBI.

With this configuration, if, for example, the bit values of the bit positions b5 to b3 and b2 to b0 of the interrupt control register 9d are set to 001 and 000, respectively, and the bit values of the bit positions b5 to b3 and b2 to b0 of the interrupt control register 9e are set to 001 and 000, respectively (mode 1), the operation is as follows. That is, #0 is stored in the CPUID register 9c as the CPUID and when the counter 9f finishes the timing of the predetermined time and outputs "1", "1" is output only from the output part t24 of the OR circuit 13b and the output is input to the interrupt request signal NMI of the CPU #1 and then the non-maskable interrupt processing is executed by the CPU #1. On the other hand, #1 is stored in the CPUID register 9c as the CPUID and when the counter 9f finishes the timing of the predetermined time and outputs "1", "1" is output only from the output part t12 of the OR circuit 13a and the output is input to the interrupt request signal NMI of the CPU #0 and then the non-maskable interrupt processing is executed by the CPU #0.

<Specifications of Interrupt Control Registers 9d and 9e>

The interrupt control registers 9d and 9e are configured so as to be able to store 32-bit data as shown in FIG. 4. To the bit positions b31 to b6 of the interrupt control registers 9d and 9e, for example, zero is set and fixed. Reading (R) from or writing (W) to each of the bit positions b31 to b6 is not available. To the bit positions b5 to b3, any of bit strings 000, 001, 010, and 100 is stored. Reading (R) from and writing (W) to each of the bit positions b5 to b3 are made available.

The interrupt processing to be executed when 000, 001, 010, or 100 is stored in the bit position b5 to b3 and the CPU that executes the interrupt processing are as shown in Function column in FIG. 4. The interrupt processing to be executed when 000, 001, 010, or 100 is stored in the bit position b2 to b0 and the CPU that executes the interrupt processing are also as shown in Function column in FIG. 4.

<Example of Setting Data to Interrupt Control Registers 9d and 9e>

FIG. 5 shows examples of the bit values (setting data) to be set to each of the bit positions b5 to b3 and b2 to b0 of the interrupt control registers 9d and 9e and a table of correspondence between the kinds of interrupt processing to be executed for each setting and the CPU that executes the interrupt processing.

In the mode 1, as described above, 001 and 000 are set to each of the bit positions b5 to b3 and b2 to b0 of the interrupt control register 9d, respectively, and 001 and 000 are set to the bit positions b5 to b3 and b2 to b0 of the interrupt control register 9e, respectively. In this mode, when the counter 9f finishes the timing of the predetermined time, the non-maskable interrupt request signal is output only to the CPU #0 in the case of the occurrence during the period of access by the CPU #0 (no interrupt request signal is output to the other CPU #1), and on the other hand, in the case of the occurrence during the period of access by the CPU #1, the non-maskable interrupt request signal is output only to the CPU #1 (no interrupt request signal is output to the other CPU #0).

In the mode 2, 010 and 000 are set to the bit positions b5 to b3 and b2 to b0 of the interrupt control register 9d, respectively, and 010 and 000 are set to the bit positions b5 to b3 and b2 to b0 of the interrupt control register 9e, respectively. In this mode, when the counter 9f finishes the timing of the predetermined time, the maskable interrupt request signal is output only to the CPU #0 in the case of the occurrence during the period of access by the CPU #0 (no interrupt request signal is output to the other CPU #1), and on the other hand, in the case of the occurrence during the period of access by the CPU #1, the maskable interrupt request signal is output only to the CPU #1 (no interrupt request signal is output to the other CPU #0).

In the mode 3, 100 and 000 are set to the bit positions b5 to b3 and b2 to b0 of the interrupt control register 9d, respectively, and 100 and 000 are set to the bit positions b5 to b3 and b2 to b0 of the interrupt control register 9e, respectively. In this mode, when the counter 9f finishes the timing of the predetermined time, the debug interrupt request signal is output only to the CPU #0 in the case of the occurrence during the period of access by the CPU #0 (no interrupt request signal is output to the other CPU #1), and on the other hand, in the case of the occurrence during the period of access by the CPU #1, the debug interrupt request signal is output only to the CPU #1 (no interrupt request signal is output to the other CPU #0).

In the mode 4, 001 and 000 are set to the bit positions b5 to b3 and b2 to b0 of the interrupt control register 9d, respectively, and 001 and 000 are set to the bit positions b5 to b3 and b2 to b0 of the interrupt control register 9e, respectively. In this mode, when the counter 9f finishes the timing of the predetermined time, the non-maskable interrupt request signal is output to all of the CPUs #0 and #1 both in the case of the occurrence during the period of access by the CPU #0 and in the case of the occurrence during the period of access by the CPU #1.

In the mode 5, 010 and 010 are set to the bit positions b5 to b3 and b2 to b0 of the interrupt control register 9d, respectively, and 010 and 010 are set to the bit positions b5 to b3 and b2 to b0 of the interrupt control register 9e, respectively. In this mode, when the counter 9f finishes the timing of the predetermined time, the maskable interrupt request signal is output to all of the CPUs #0 and #1 both in the case of the occurrence during the period of access by the CPU #0 and in the case of the occurrence during the period of access by the CPU #1.

In the mode 6, 100 and 100 are set to the bit positions b5 to b3 and b2 to b0 of the interrupt control register 9d, respectively, and 100 and 100 are set to the bit positions b5 to b3 and b2 to b0 of the interrupt control register 9e, respectively. In this mode, when the counter 9f finishes the timing of the predetermined time, the debug interrupt request signal is output to all of the CPUs #0 and #1 both in the case of the occurrence during the period of access by the CPU #0 and in the case of the occurrence during the period of access by the CPU #1.

In the mode 7, 001 and 010 are set to the bit positions b5 to b3 and b2 to b0 of the interrupt control register 9d, respectively, and 001 and 010 are set to the bit positions b5 to b3 and b2 to b0 of the interrupt control register 9e, respectively. In this mode, when the counter 9f finishes the timing of the predetermined time, the non-maskable interrupt request signal is output to the CPU #0 and the maskable interrupt request signal is output to the other CPU #1 in the case of the occurrence during the period of access by the CPU #0, and on the other hand, in the case of the occurrence during the period of access by the CPU #1, the non-maskable interrupt request signal is output to the CPU #1 and the maskable interrupt request signal is output to the other CPU #0.

In the mode 8, 100 and 010 are set to the bit positions b5 to b3 and b2 to b0 of the interrupt control register 9d, respectively, and 100 and 010 are set to the bit positions b5 to b3 and b2 to b0 of the interrupt control register 9e, respectively. In this mode, when the counter 9f finishes the timing of the predetermined time, the debug interrupt request signal is output to the CPU #0 and the maskable interrupt request signal is output to the other CPU #1 in the case of the occurrence during the period of access by the CPU #0, and on the other hand, in the case of the occurrence during the period of access by the CPU #1, the debug interrupt request signal is output to the CPU #1 and the maskable interrupt request signal is output to the other CPU #0.

<Explanation of Operation of Multi-Core LSI 1>

For reference to understand the characteristics of the present invention, the outline of the operation of a conventional multi-core LSI having, for example, two CPUs #0 and #1 will be described based on FIG. 6 to FIG. 8.

Here, a case will be described, in which processing A by the CPU #0, processing B by the CPU #1, processing C by CPU #0, and processing D by the CPU #1 are performed in this order.

The processing A is processing to read data DA saved in the module of an address AA. The processing B is processing to write data DB in the module of an address AB. The processing C is processing to write data DC in the module of an address AC. The processing D is processing to read data DD saved in the module of an address AD.

First, the operation in the normal state will be described based on FIG. 6. The processing A is first executed by the CPU #0. That is, #0 as the CPUID, a read command as the command, and AA as the address are output from the CPU #0 to the shared bus as an access request signal (T1 in FIG. 6). Then, when the access request signal is acquired by the module of the address AA (T2 in FIG. 6), the data DA to be read and a response signal r1 to the access request signal are output from the module to the shared bus (T3 in FIG. 6) and when the response signal r1 is acquired by the CPU #0 along with the data DA, the processing A is completed and the next processing B is executed by the CPU #1 in a similar manner. Then, when a response signal r2 to the access request signal of the processing B is output from the module of the address AB (T4 in FIG. 6), the processing B is completed and the next processing C is executed in a similar manner and when a response signal r3 to an access request signal a3 of the processing C is output, the processing C is completed and the next processing D is executed in a similar manner (refer to FIG. 8(a)).

Figure 7:
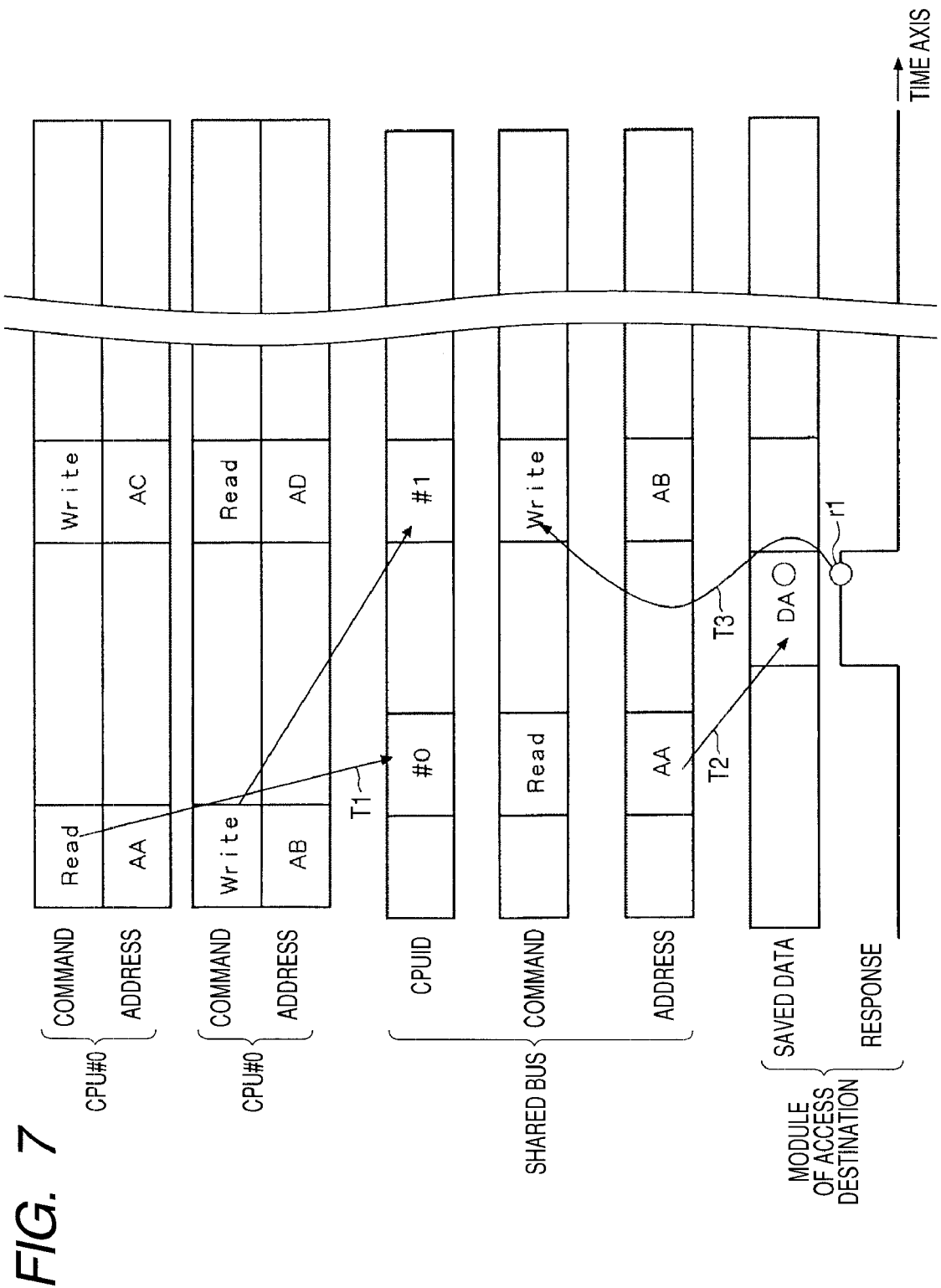
FIG. 7 is a diagram for explaining the outline of the operation when a timeout occurs (when a bug occurs) in the conventional multi-core LSI.

With such a conventional multi-core LSI, in the case where, for example, the processing B is executed by the CPU #1, if the response signal r2 to the access request signal is not output because of a bug etc. from the module to be accessed, the processing B cannot be completed and therefore the next processing C cannot be executed and the operation stops as shown in FIG. 7 and FIG. 8(b). As described above, if no response signal is output from the access destination because processing with a bug is executed, the CPU (for example, #1) that has executed the processing will occupy the shared bus for a long period of time, and therefore, the other CPU with no problem (for example, #0) cannot execute the next processing and the operation of the multi-core LSI stops.

With the conventional multi-core LSI, if the operation stops as described above, it is difficult to identify which access by which of the CPUs #0 and #1 has caused the operation to stop (that is, in which a bug has occurred) because there is a plurality of CPUs, despite as is easy in the case of a single-core LSI.

Next, the operation of the multi-core LSI 1 according to the present embodiment will be described based on FIG. 1 and FIG. 9.

In the same manner as described above, a case will be described, where the processing A by the CPU #0, the processing B by the CPU #1, the processing C by the CPU #0, and the processing D by the CPU #1 are executed in this order. The content of each of the processing A, B, C, and D is the same as that described above.

First, the processing A is executed by the CPU #0. That is, #0 as the CPUID, a read command as the command, and AA as the address are output from the CPU #0 to the shared bus b1 as an access request signal (S1 in FIG. 9).

Then, the access request signal output to the shared bus b1 is acquired by the shared bus controller 3 and output to the shared bus b2. Then, the access request signal output to the shared bus b2 is acquired by the module (for example, m1) of the address AA and at the same time, the command (read) is acquired by the system controller 9. Then, in the system controller 9, triggered by the acquisition of the command, the timing of the predetermined time by the counter 9f is started (here, from 15 to 0 is timed) (S2 in FIG. 9).

Then, before the counter 9f finishes the timing of the predetermined time, if a response signal to the access request signal and the data DA to be read are output from the module m1 of the address AA to the shared bus b2 and at the same time, the response signal is output to the system controller 9 via the dedicates wiring line 11 (S3 in FIG. 9), the system controller 9 to which the response signal is input determines that the shared buses b1 and b2 have not hung up due to a bug etc. and the timing of the predetermined time by the counter 9f is suspended (S4 in FIG. 9).

The response signal and the data DA output from the module m1 of the address AA to the shared bus b2 are acquired by the shared bus controller 3 and output to the shared bus b1, and acquired by the CPU #0 while accessing and then the processing A is completed.

Then, the next processing B is executed by the CPU #1. That is, in a similar manner to that of the processing A, an access request signal is output from the CPU #1 to the shared bus b1 (S5 in FIG. 9). The access request signal is acquired by the shared bus controller 3 and output to the shared bus b2, and acquired by the module (for example, m2) of the address AB and at the same time, the command (write) is acquired by the system controller 9. Then, in the system controller 9, triggered by the acquisition of the command described above, the timing of the predetermined time by the counter 9f is started (S6 in FIG. 9).

Then, if the counter 9f finishes the timing of the predetermined time before a response signal to the access request signal and the data DA to be read are output from the module m2 of the address AB to the shared bus b2 and at the same time, the response signal is output to the system controller 9 via the dedicated wiring line 11 (S7 in FIG. 9), a signal to that effect (a timeout signal) is output from the counter 9g (S8 in FIG. 9) and based on the output, the system controller 9 determines that the shared buses b1 and b2 have hung up because there occurs a bug etc.

Triggered by this determination, a pseudo response signal is output from the system controller 9 to the shared bus controller 3 via, for example, the dedicated wiring line 12 (S9 in FIG. 9), the pseudo response signal is output from the shared bus controller 3 to the shared bus b1 and acquired by the CPU #1 while accessing and thus the processing B is terminated forcibly. Then, the next processing C is executed by the CPU #0 (S12 in FIG. 9).

Also triggered by the above determination, the address (AB), the command (write), and the CPUID (#1) of the access request signal are acquired by the system controller 9 from the shared bus b2 and stored in each of the registers 9a, 9b, and 9c of the system controller 9, respectively (S10 in FIG. 9).

Then, the system controller 9 outputs an interrupt request signal to the interrupt input signals NMI, DBI, and INT of each of the CPUs #0 and #1 in accordance with the CPUID stored in the CPUID register 9 and the setting data stored in advance in the interrupt control registers 9d and 9e (S11 in FIG. 9). Then, triggered by this interrupt request signal, various interrupt processing is executed by the CPUs #0 and #1. Then, in a similar manner, the next processing C and D are executed sequentially.

As described above, with the multi-core LSI 1 according to the present embodiment, in comparison to the conventional multi-core LSI, if a response signal to the access request signal is not output from the module to be accessed after the access request signal is output to the shared bus b2 and before a predetermined time elapses, a pseudo response signal is output from the system controller 9 and triggered by the pseudo response signal, the access by the CPUs #0 and #1 while accessing is terminated forcibly and the next processing is executed, and therefore, it is possible to prevent the operation of the multi-core LSI 1 from stopping.

In addition to the pseudo response signal, request signals of various interrupt processing are output to the CPUs #0 and #1 from the system controller 9, and therefore, it is possible to identify which access by which of the CPUs #0 and #1 has caused a hang-up when the shared buses b1 and b2 have hung up due to the occurrence of a bug etc. by confirming the point at which the interrupt processing by the CPU #0 or #1 is executed.

<Main Effects>

According to the multi-core LSI 1 configured as described above, the system controller 9 outputs a pseudo response signal to the shared bus b1 via the shared bus controller 3 and terminates the access by the CPU #0 or #1 while accessing if a response signal is not output from the modules m1 to mn of the access destination or from the external bus controller 9 after an access request signal is output from the shared bus controller 3 to the shared bus b2 and before a predetermined time elapses. Consequently, it is possible to prevent the CPU

0 or #1 while accessing from occupying the shared buses b1 and b2 for a long period of time and thereby the operation of the multi-core LSI 1 from stopping even if a response signal is not output from the module to be accessed because of the occurrence of a bug etc, and therefore, the stability of the operation of the multi-core LSI can be improved.

Further, the system controller 9 causes the CPU #0 or #1 while accessing to execute an interrupt processing if a response signal is not output from the modules m1 to mn to be accessed or the external bus controller 9 after an access request signal is output from the shared bus controller 3 to the shared bus b2 and before a predetermined time elapses. As a result, it is possible to identify which access by which of the CPUs #0 and #1 has caused a hang-up when the shared buses b1 and b2 have hung up due to the occurrence of a bug etc. by confirming the point at which the interrupt processing by the CPU #0 or #1 is executed, and the efficiency of program development can be improved.

Furthermore, the system controller 9 causes the CPU #0 or #1 while accessing to execute the non-maskable interrupt processing, the maskable interrupt processing, or the debug interrupt processing as an interrupt processing. As a result, it is possible to set priority of interrupt processing according to the kind of interrupt processing.

The system controller 9 causes all of the CPUs #0 and #1 to execute an interrupt processing if a response signal is not output from the modules m1 to mn to be accessed or the external bus controller 9 after an access request signal is output from the shared bus controller 3 to the shared bus b2 and before a predetermined time elapses. As a result, it is possible to more easily identify which access by which of the CPUs #0 and #1 has caused a hang-up when the shared buses b1 and b2 have hung up due to the occurrence of a bug etc. by confirming the point at which the interrupt processing is performed not only by the CPU encountered with the occurrence of a bug but also by the normal CPU, and then the efficiency of program development can be improved.

It may also be possible to set so that the system controller 9 causes the CPU #0 or #1 while accessing to execute the non-maskable interrupt processing as the above-mentioned interrupt processing and causes the other CPU #0 or #1 to execute the maskable interrupt processing. As a result, it is possible to change the priority of interrupt processing in accordance with the CPU encountered with the occurrence of a bug or the normal CPU.

It may also be possible to set so that the system controller 9 causes the CPU #0 or #1 while accessing to execute the debug interrupt processing as the above-mentioned interrupt processing and causes the other CPU #0 or #1 to execute the maskable interrupt processing. As a result, it is possible to change the priority of interrupt processing in accordance with the CPU encountered with the occurrence of a bug or the normal CPU.

Further, the system controller 9 saves at least one of the CPUID, the read/write command, and the address (in the description of the operation, the case is described, where all of the three are saved) that the CPU #0 or #1 while accessing has output at the time of its accessing, if a response signal is not output from the modules m1 to mn to be accessed or the external bus controller 5 after an access request signal is output from the shared bus controller 3 to the shared bus b2 and before a predetermined time elapses. As a result, it is possible to more easily identify which access by which of the CPUs #0 and #1 has caused the occurrence of a bug etc. when the shared buses b1 and b2 have hung up due to the occurrence of a bug etc. based on the saved CPUID, command, or address, and then the efficiency of program development can be improved.

When receiving a termination request signal from a predetermined external device, the system controller 9 terminates the access by the CPU #0 or #1 while accessing by outputting a pseudo response signal to the shared bus b1 via the shared bus controller 3 even before the predetermined time by the counter 9f elapses. As a result, it is possible to forcibly terminate the access by the CPU #0 or #1 while accessing even before the predetermined time elapses upon receipt of a termination request signal from a predetermined external device.

Second Embodiment

The above-mentioned configuration of the multi-core LSI is also effective when the shared buses b1 and b2 have a bus configuration of packet transaction or split transaction.

In these bus configurations, when, for example, accessing a memory etc. via the shared bus b1, the CPU #0 preserves the bus right of the shared bus b1 when issuing an access command to the memory and then issues the access command and releases once the bus right of the shared bus b1. Consequently, it is possible for the other CPU #1 to access the shared bus b1 after the bus right is released.

In this case, it is possible for the CPU #1 to access the shared buses b1 and b2 even if the access by the CPU #0 to the memory is an unauthorized access and the above-mentioned shared bus b1 or b2 is caused to hang up. In such a case, however, if the configuration is, for example, a symmetric multi processing (SMP) configuration, the CPU #0 is in the suspended state of awaiting a response from the memory, and therefore, the processing by the CPU #0 is not completed and the processing executed by the CPU #1 is also affected.

When the system controller 9 issues a pseudo response signal to the memory access by the CPU #0, the CPU #0 restores from the suspended state and it is made possible for the CPU #0 to specify a correct address to issue again a memory access and thereby the entire system of the multi-core LSI can be maintained in the stable state. Further, the frequent occurrence of such an unauthorized memory access can be made clear from the saved CPUID, command, or address, and therefore, it is possible to more clearly specify which access by which of the CPUs #0 and #1 has caused the occurrence of a bug etc., and thus, the efficiency of program development can be improved.

The present invention can be used for a multi-core LSI on which a plurality of CPUs is mounted on the same LSI and effective not only at the time of debugging by a debugger but also at the time of the normal operation.

What is claimed is:

1. A semiconductor device comprising:
a plurality of central processing units;
a control unit; and
a memory,
wherein a first central processing unit of the plurality of central processing units is configured to issue an access request to the memory, and to wait for an acknowledge signal issued from the memory,
wherein the control unit is configured to issue a first signal to the first central processing unit in place of the acknowledge signal from the memory when the memory has not issued the acknowledge signal for a predetermined period after the first central processing unit issues the access request, wherein the control unit is configured to save a CPUiD of the first central processing unit to which the first signal was issued, and wherein the first central processing unit is configured to cease waiting for receipt of the acknowledge signal upon receiving the first signal, and is configured to issue the access request accompanied with a first access address from a second access address accompanying the access request which the first central processing unit provides while awaiting receipt of the acknowledge signal.

2. A semiconductor device according to claim 1, wherein the second access address or a command of the access request, or both, are saved by the control unit upon issuing the first signal.

3. A semiconductor device according to claim 1, further comprising:

a bus, wherein the bus is coupled with the plurality of central processing units, and is a split transaction protocol bus, and wherein the first central processing unit receives a bus access before issuing the access request, and releases the bus access after issuing the access request while awaiting receipt of the acknowledge signal.

* * * * *